US006263569B1

(12) United States Patent
Morton

(10) Patent No.: US 6,263,569 B1
(45) Date of Patent: Jul. 24, 2001

(54) METHOD OF MANUFACTURING A STANDARDIZED FUEL INJECTOR FOR ACCOMMODATING MULTIPLE INJECTOR CUSTOMERS

(75) Inventor: Greg R. Morton, Yorktown, VA (US)

(73) Assignee: Siemens Automotive Corporation, Auburn Hills, MI (US)

( * ) Notice: Subject to any disclaimer, the term of this patent is extended or adjusted under 35 U.S.C. 154(b) by 0 days.

(21) Appl. No.: 09/343,755

(22) Filed: Jun. 30, 1999

(51) Int. Cl.$^{7}$ .................................................. B23P 15/00

(52) U.S. Cl. ................................ 29/888.4; 29/890.129; 29/890.132

(58) Field of Search ..................... 29/890.127, 890.129, 29/890.132, 888.4, 602.1; 239/585.1, 585.5

(56) References Cited

U.S. PATENT DOCUMENTS 5,155,461 * 10/1992 Teerman et al. .................. 29/602.1
5,157,967 * 10/1992 Wieczorek ............................ 73/119
5,185,919 * 2/1993 Hickey ................................ 29/602.1
5,625,946 * 5/1997 Wildeson et al. ................. 29/888.41
5,775,599 * 7/1998 Smith et al. ...................... 239/585.3
5,937,520 * 8/1999 Earhart et al. .................... 29/890.13

* cited by examiner

*Primary Examiner*—I Cuda Rosenbaum

(57) ABSTRACT

A method of manufacturing and testing a standardized fuel injector configuration accommodates multiple fuel injector customers. Initially, a fuel injector is molded, the fuel injector having an inlet end and an outlet end. Passage of fuel through the fuel injector is controlled between the inlet end and the outlet end. The electrical terminal geometry to be molded with the electrically operated fuel injector is selected, and electrical current flow for the fuel injector is generated through the electrical terminals. The selected electrical terminal geometry is accessible for connection to any of a plurality of different connectors, which are independently molded. Test processes are conducted on the fuel injector and, subsequently, an independently molded post electrical plug is installed, encompassing the electrical terminals.

6 Claims, 3 Drawing Sheets

METHOD OF MANUFACTURING A STANDARDIZED FUEL INJECTOR FOR ACCOMMODATING MULTIPLE INJECTOR CUSTOMERS

FIELD OF THE INVENTION

This invention relates generally to fuel injectors of the type that are used to inject fuel into the induction system of an internal combustion engine, and particularly to a standardized fuel injector configuration capable of accommodating multiple injector customers.

BACKGROUND OF THE INVENTION

Currently, fuel injectors are molded in several lengths, and multiple electrical plug designs are required for each of multiple customers. For each injector length, for example, there may be as many as five different connector or plug designs required by a multitude of customers. Each different plug design requires re-molding of the entire injector assembly, to incorporate the various plug designs. This not only costs excess dollars in extra molding tools, but also in electrical contact tooling.

Furthermore, for each different plug design, the injector must be assembled and tested individually, requiring much changeover time to be spent in both assembly and test areas of production. The multitude of connector or plug designs for each of a multitude of customers results in a statistical exercise of great magnitude, to properly assemble and test each separate design.

It is seen then that there exists a need for a standardized molded fuel injector geometry which comprises a standard post electrical plug assembly, capable of receiving multiple lengths and designs of plugs to accommodate multiple customers, which can be installed after assembly and testing of the standard fuel injector.

SUMMARY OF THE INVENTION

This need is met by the method of manufacturing and testing, for a plurality of customers, a standardized fuel injector geometry, in accordance with the present invention. Thus, any of a multitude of different electrical plug or cover designs can be ultrasonically welded in place on a standardized molded fuel injector geometry after final assembly or test processes are passed, thereby creating a customer-ready standardized fuel injector geometry. This eliminates re-molding of the entire injector assembly to accommodate each different plug design for each of a plurality of customers. The method of generating a standardized fuel injector and testing said standardized fuel injector for use by a plurality of customers allows for reduced process or equipment investment and a standard product geometry for the molded injector.

In accordance with one embodiment of the present invention, a method of manufacturing and testing a standardized fuel injector configuration for a plurality of customers is provided. Initially, a fuel injector is molded, the fuel injector having an inlet end and an outlet end. Passage of fuel through the fuel injector is controlled between the inlet end and the outlet end. The electrical terminal geometry to be molded with the electrically operated fuel injector is selected, and electrical current flow for the fuel injector is generated through the electrical terminals. The selected electrical terminal geometry is accessible for connection to any of a plurality of different connectors, which are independently molded. Test processes are conducted on the fuel injector and, subsequently, an independently molded post electrical plug is installed, encompassing the electrical terminals. The post electrical plug allows for connection to a mating connector, via which the injector is operated from an electronic engine control. The post electrical plug of the present invention is configured to accommodate multiple fuel injector geometries for a plurality of fuel injector customers.

It is an advantage of the present invention that a single mold design is provided for each injector length, with the standardized fuel injector geometry of the present invention being capable of accommodating multiple plug designs for a plurality of fuel injector customers.

For a full understanding of the nature and objects of the present invention, reference may be had to the following detailed description taken in conjunction with the accompanying drawings and the appended claims.

DESCRIPTION OF THE PREFERRED EMBODIMENT

Figure 1:
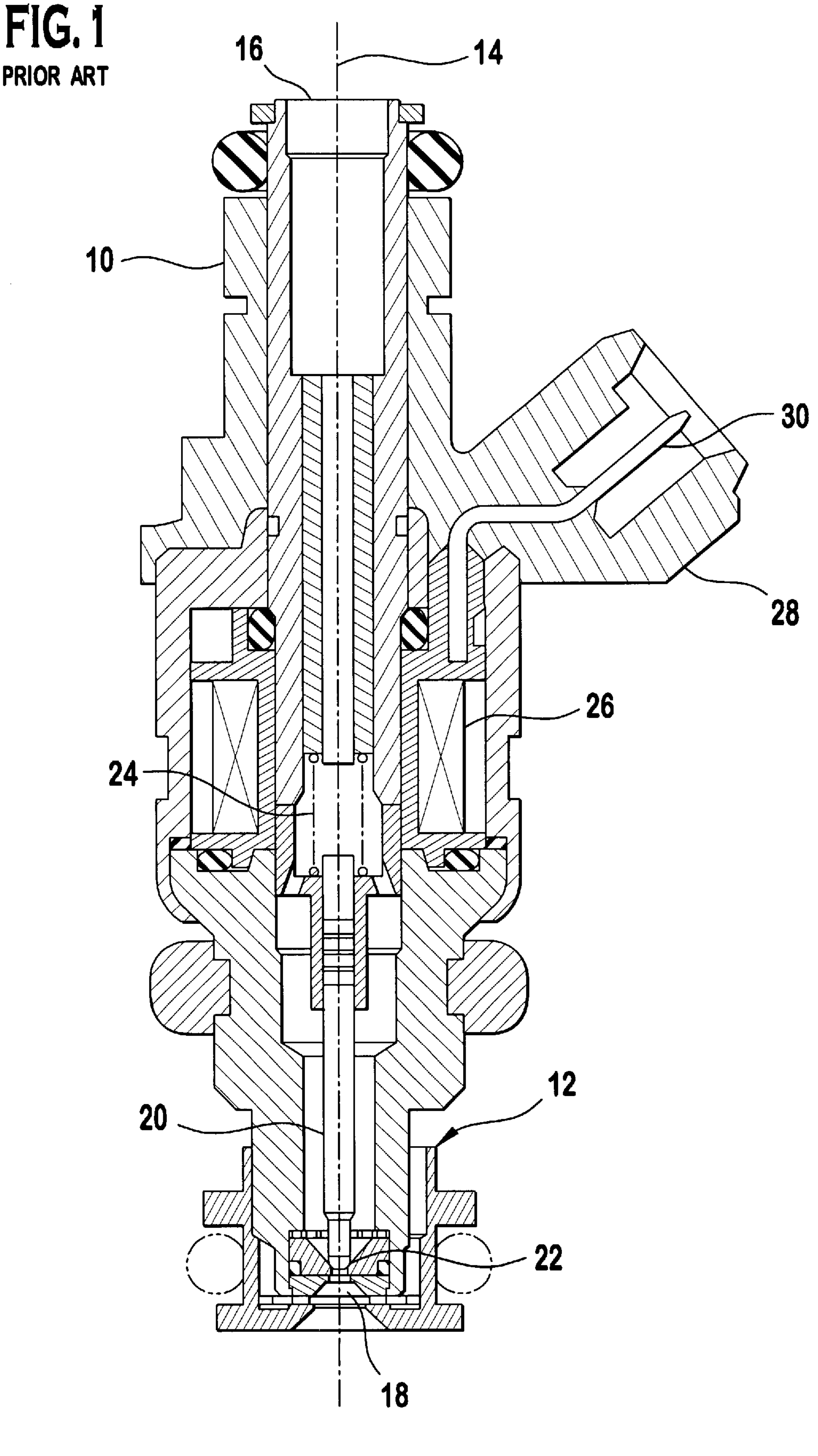
FIG. 1 PRIOR ART
FIG. 1 illustrates a common molded fuel injector geometry, with an electrical plug shown molded integrally with the injector.

Referring now to FIG. 1, there is shown, for purposes of description only, a typical molded electrically operated fuel injector 10, which can contain an air assist atomizer 12. Fuel injector 10, shown closed, has a main longitudinal axis 14 and is a top-feed type device comprising an inlet 16 and a nozzle 18 at its opposite axial ends. Fuel passing through the fuel injector is typically liquid fuel, but may be any fuel including, for example, gas or other fuel. The passage of fuel through the fuel injector between inlet 16 and nozzle 18 is controlled by the seating and unseating of the rounded tip end of a metal needle 20 on and from a valve seat 22 located just interior of nozzle 18. Needle 20 is resiliently biased by a spring 24 to seat on seat 22, thereby closing the passage to flow. When the valve is electrically energized by the delivery of electric energizing current to its solenoid coil 26, the needle unseats to allow fuel flow. An electrical connector 28, cutaway to illustrate an encompassed electrical terminals 30, is accessible for connection to a mating connector of, for example, a wiring harness, via which the injector's solenoid is operated from an electronic engine control. In the existing art, the connector 28 is molded with the injector 10. Therefore, each of the multiple connector geometries in the existing art require that the entire injector be molded to accommodate each variation in connector 28.

Figure 2:
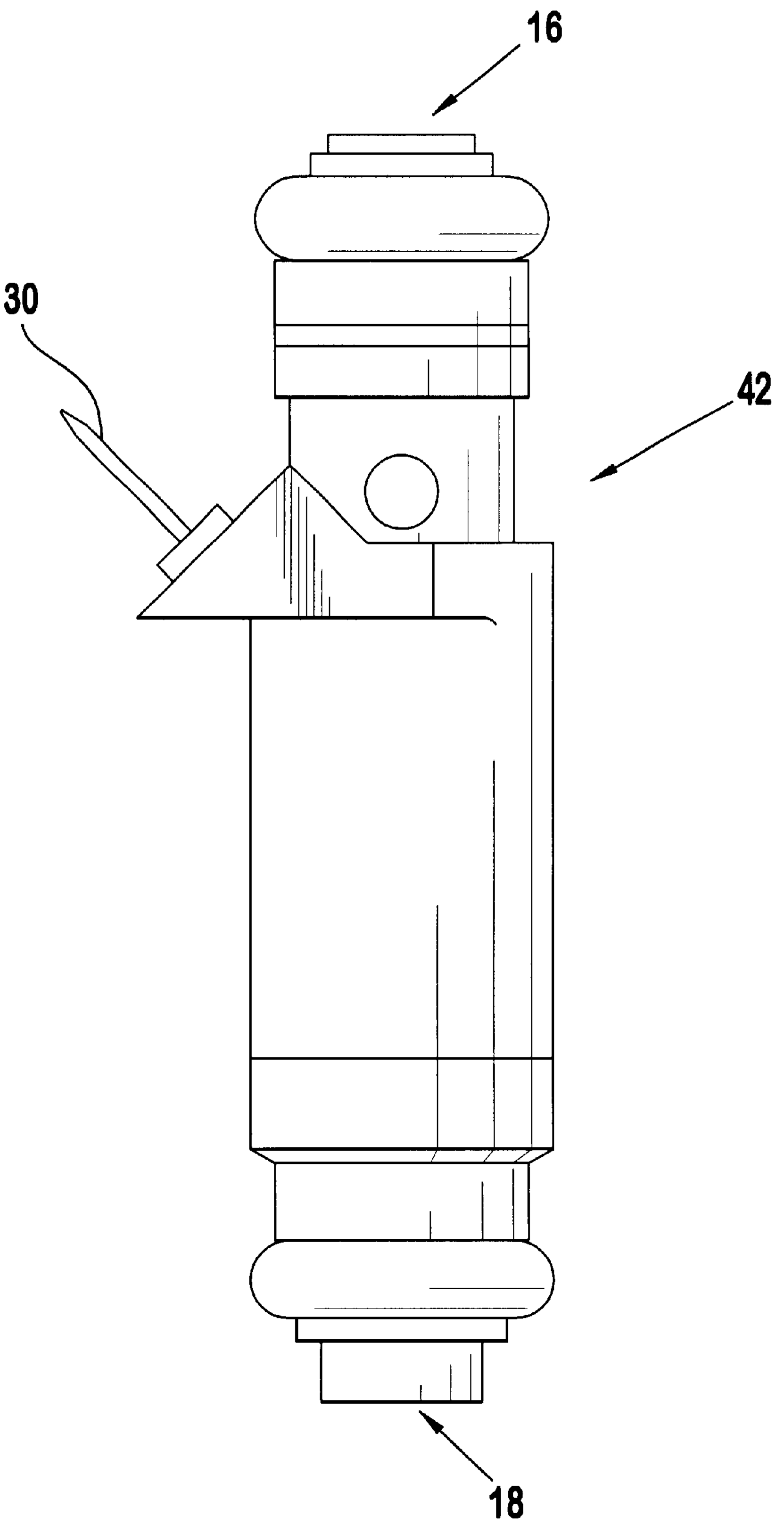
FIG. 2 illustrates a standardized molded fuel injector geometry,.according to the present invention, wherein the electrical post receives any of a multitude of plug configurations after final assembly and test processes are passed.
Figure 3:
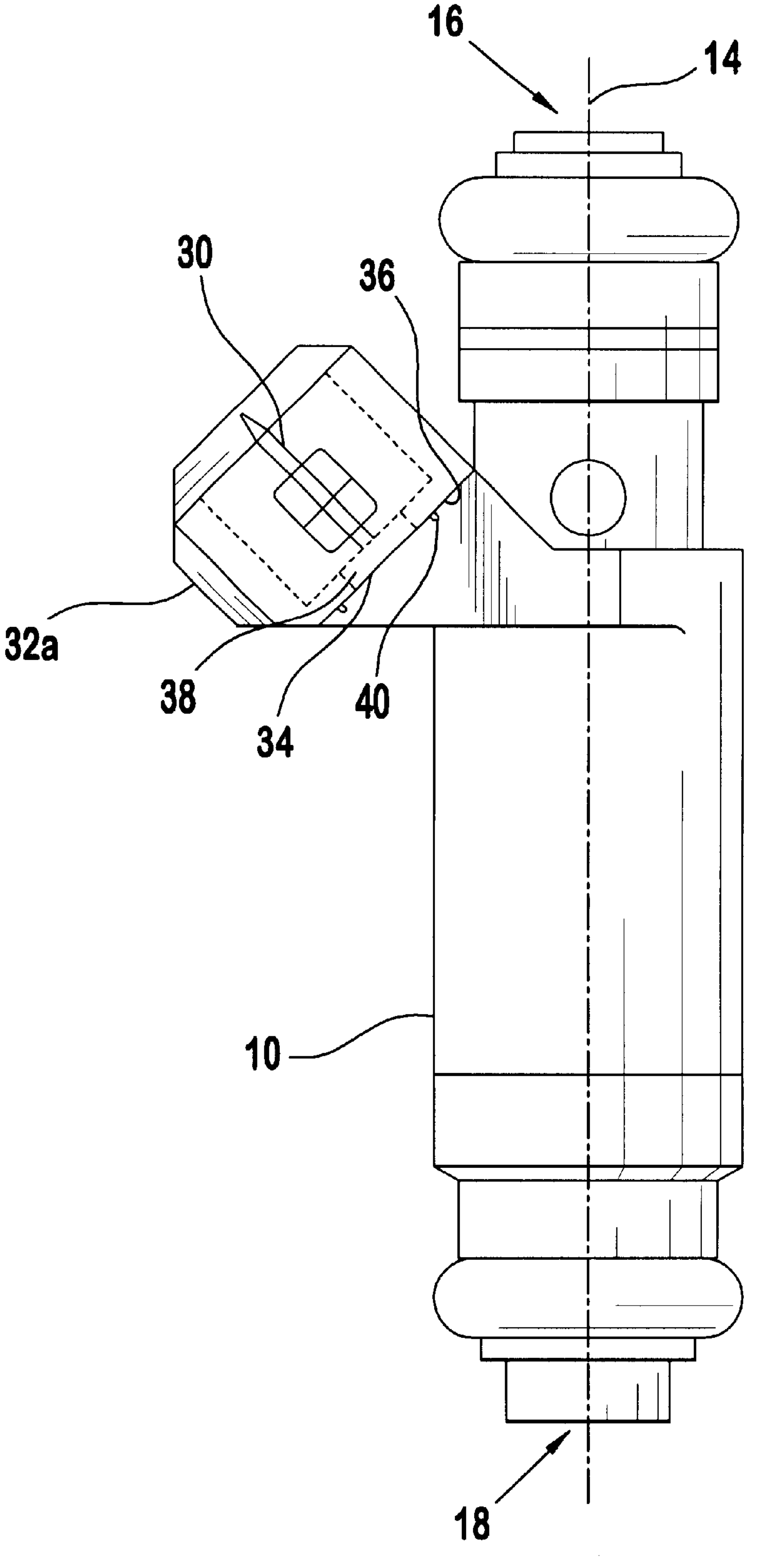
FIG. 3 illustrates the standardized molded fuel injector geometry, after assembly and test processes are passed, with one embodiment of a plug installed thereon.

In accordance with the present invention, and referring now to FIG. 2, a customer-ready standardized molded fuel injector geometry 42 is proposed, capable of accommodating a plurality of customers and different needs for those plurality of customers. In accordance with the method of manufacturing according to the present invention, the plug portion is installed separately, rather than integrally molded with the injector of the prior art, as shown by 28 in FIG. 1. The terminal 30, therefore, does not receive a cover until assembly and testing processes are completed. Once the assembly and testing processes are passed, the electrical plug or cover 32*a* for the electrical post 30 is ultrasonically welded in place, as illustrated by FIG. 3. For any given fuel injector length and plug angle for each of a multitude of customers and customer requirements, the present invention provides for a single mold tool with a single mold color having interchangeable plug slides to accommodate different terminal or post 30 geometries of the fuel injector. Hence, multiple batches of a single molded fuel injector geometry 42 can be generated, assembled, and tested, for a plurality of customers, without requiring re-molding and testing of the entire injector assembly to accommodate various plug designs.

In a preferred embodiment of the invention, the terminal posts 30 would be greater than 50% exposed. A rectangular, square or circular stepped base 34 provides strength, support, and orientation. The stepped base geometry receives and orients the post electrical plug 32*a*, and allows for a weld attachment to the post electrical plug. The weld attachment can provide permanent ultrasonic weld of the post electrical plug 32*a*, after assembly and test processing. A lower shelf or surface 36 of the stepped base 34 is preferably approximately flat to accept the radiused weld bead 40 on the separate electrical plug 32*a*.

Continuing with FIG. 3, the molded electrical plug 32*a* has an opening 38 in a bottom surface that mates with the stepped base 34 contour. A radiused weld bead 40 can be molded into the bottom of the plug 32*a* to add weldability and to provide a leak-tight seal. The assembly process can be any suitable process, such as a feeding position, a load-and-press position, an ultrasonic welding position and leak test. The radiused weld bead and step base geometries would be designed to fit multiple plugs, such as, for example, plugs as disclosed and claimed in co-pending, commonly assigned, U.S. patent application Ser. No. 09/312,166 (Attorney Docket No.99P7580US) totally incorporated herein by reference.

Those skilled in the art will now be able to recognize multiple advantages to be realized from the method for manufacturing a customer-ready, standardized fuel injector assembly. For example, the single mold design for each injector length will not only benefit multiple customers, but will lower mold tool costs. Furthermore, different terminal/plug geometries using full contact probes will no longer require additional assembly or test changeovers to be performed for each of a plurality of customers, thereby reducing labor and tooling costs. The method of manufacturing a standardized fuel injector assembly standardizes injector body color and reduces color identification material cost. The present invention also allows for optional assembly at the end of the assembly line on finished goods, and optional weld of complete wire assembly or cover for terminal extensions.

Having described the invention in detail and by reference to the preferred embodiment thereof, it will be apparent that other modifications and variations are possible without departing from the scope of the invention defined in the appended claims.

What is claimed is:

1. A method of generating multiple batches of a single standardized fuel injector for use by a plurality of customers comprising:

molding an electrically operated fuel injector;

selecting one of a plurality of electrical terminal geometries to be molded with the electrically operated fuel injector, the selected electrical terminal geometry accessible for connection to any of a plurality of different connectors;

independently molding the plurality of different connectors;

conducting test processes on the electrically operated fuel injector; and installing any one of the independently molded plurality of different connectors to the electrical terminal geometry after the test processes are passed.

2. A method as claimed in claim 1, further comprising providing a plurality of interchangeable plug slides attachable to the fuel injector, the plurality of interchangeable plug slides capable of accommodating any selected electrical terminal geometry.

3. A method as claimed in claim 1, wherein installing any one of the independently molded plurality of different connectors to the electrical terminal geometry further comprises ultrasonically welding a selected connector in place.

4. A method of generating multiple batches of a single standardized fuel injector for use by a plurality of customers comprising:

molding an electrically operated fuel injector;

selecting one of a plurality of electrical terminal geometries to be molded with the electrically operated fuel injector, the selected electrical terminal geometry accessible for connection to any of a plurality of different connectors;

independently molding the plurality of different connectors;

installing any one of the independently molded plurality of different connectors to the electrical terminal geometry; and conducting test processes on the electrically operated fuel injector.

5. A method as claimed in claim 4, further comprising providing a plurality of interchangeable plug slides attachable to the fuel injector, the plurality of interchangeable plug slides capable of accommodating any selected electrical terminal geometry.

6. A method as claimed in claim 4, wherein installing any one of the independently molded plurality of different connectors to the electrical terminal geometry further comprises ultrasonically welding a selected connector in place.

* * * * *